United States Patent Office 3,135,784
Patented June 2, 1964

3,135,784
PROCESS FOR THE PRODUCTION OF ESTERS
Jack B. Feder, Dumont, N.J., assignor to Halcon International, Inc., a corporation of Delaware
No Drawing. Filed June 29, 1961, Ser. No. 120,595
8 Claims. (Cl. 260—476)

This invention relates to a process for preparing esters such as vinyl acetate from acetylene and acetic acid, more particularly to such a process carried out in the presence of a catalyst, and especially to such a process wherein the catalyst is purged with an inert gas whenever the operation is shut down, in order to avoid loss of catalyst activity or useful life.

Generally, catalysts used in the reaction of acetic acid and acetylene lose activity gradually. These catalysts are an expensive part of the operation, and the art is confronted by the problem of minimizing or avoiding undue loss in catalyst activity or undue shortening of the catalyst life.

The discoveries associated with the invention and relating to the solution of the above problems, and the objects achieved in accordance with the invention as set forth herein include the provision of:

A process for the production of esters by the catalytic vapor phase reaction of acetylene or allene (propadiene) or methyl acetylene with a saturated monocarboxylic acid containing 1 to 7 carbon atoms in the molecule or benzoic acid, including the improvement of purging the catalyst with a non-destructive gas during temporary shutdown of the operation, whereby catalyst activity is maintained;

Such a process wherein the purging is with an inert gas;

Such a process wherein the gas is nitrogen or acetylenic reactant;

Such a process wherein the catalyst is active carbon impregnated with a zinc salt and there is produced vinyl acetate, vinyl butyrate, vinyl benzoate, propenyl acetate or isopropenyl acetate;

Such a process wherein the salt is the acetate; and

Other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

Acetylene and acetic acid are charged into a reactor containing as the catalyst active carbon impregnated with zinc acetate, the space velocity (measured at 60° F. and 1 atm.) being 355 per hour and the mol ratio of acetylene to acetic acid being about 5 to 1. At a reaction temperature of 176° C., there is 40.4% conversion of acetic acid (to vinyl acetate). The flow of reactants to the reactor is stopped, and the catalyst bed is immediately purged with nitrogen gas for 1.5 hours. Then purging is stopped and the reaction is resumed under the above conditions. The conversion of the acetic acid is 41.0 %.

Comparative Example A

Following the above procedure except operating at a temperature of 182° C., the conversion of acetic acid is 40.0%. Flow to the reactor is stopped for three hours, and then resumed under the same reaction conditions, but the conversion of the acetic acid is only 36%.

EXAMPLE 2

Following the above procedure except operating at 180° C., the conversion of acetic acid is 31.6%. Flow of reactants to the reactor is stopped, and the catalyst is purged with nitrogen for one hour. Upon resumption of the reaction under the above conditions except for a reactor temperature of 183° C., the acetic acid conversion is 30.9%.

Comparative Example B

Following the above procedure, but operating at 182° C., acetic acid conversion is 42.7%. Flow of reactants to the reactor is stopped for one hour, and then reaction under the above condition is resumed for 0.25 hour, and the cycle is repeated two more times, after which the acetic acid conversion is 32.3%.

Comparative Example C

Following the above procedure but operating at 182° C., the acetic acid conversion is 34.5%. Flow to the reactor is stopped for one hour, and then the reaction is resumed for 0.25 hour while maintaining the reactor at 200° C. This cycle is repeated two more times, after which the temperature is lowered to 182° C., and the acetic acid conversion is 24.2%.

It is apparent from the foregoing results that the nitrogen purging in accordance with the invention (Examples 1 and 2) gives substantially no loss in catalyst activity or no undue shortening of catalyst life; whereas with no purge there is a very marked drop in catalyst activity, or an undue shortening of catalyst life, as shown in the comparative examples.

EXAMPLE 3

Following the procedure of Example 1 except using n-butyric acid for making the butyrate, similar improved results are obtained.

EXAMPLE 4

Following the procedure of Example 1 except using benzoic acid for making the benzoate (and using 6 mols of the acetylene per mol of acid), similar improved results are obtained.

EXAMPLE 5

Following procedure of Example 1 except using methyl acetylene for making propenyl and isopropenyl acetate, similar improved results are obtained.

EXAMPLE 6

Following procedure of Example 1 except using methyl acetylene and/or propadiene for making propenyl and isopropenyl acetate, similar improved results are obtained, and likewise with methyl acetylene or propadiene as the purge.

Similar results are obtained if the purging is with acetylene or methane instead of nitrogen. The temporary shutdown may be for hours, or even days in some situations.

The catalytic process may be of the fixed bed, fluidized bed or fluidized type.

The operation in accordance with the invention can provide a 10% or more savings in the cost of catalyst per unit production on a commercial scale.

The purging of the catalyst bed or catalyst mixture may be with an inert gas and, for short shutdowns, is continued until the reaction is resumed. When shutdowns of long duration occur, purging may be discontinued after about one-half to one hour. Desirably, a blanket of the purging gas is then maintained in and over the catalyst bed in order to expedite subsequent resumption of operation. Suitable gases are nitrogen, carbon dioxide and the like as well as mixtures thereof. Alternately, other non-destructive gases such as acetylene, methane, or the like may be used as the purge. Generally, the reactors are made of ordinary or stainless steel and they are provided with indirect heat exchange means.

In carrying out the process, the specific reactants, quantities of reactants, and reaction conditions set forth in the preferred embodiments are subject to substantial variation. For example, the process is not limited to the production of vinyl acetate but applicable to the preparation of vinyl esters generally. Vinyl formates, propionates, butyrates, benzoates, and the like may be produced by reacting the respective carboxylic acids with acetylene. Lower saturated aliphatic monocarboxylic acids containing from one to seven carbon atoms are preferred, as is benzoic acid.

The acetylene and carboxylic acid vapor mixture can be passed through the reactor in equimolecular proportions or with either reactant in excess. It is preferred to operate at an acetylene to acid molecular ratio of 4 to 1. At this ratio, about 30 to 40% of the acid is reacted per pass. These dilute conditions and partial reaction help to promote increased catalyst life.

Any of the catalyst commonly employed for the vapor phase reaction of acetylene and carboxylic acids may be employed in the process. Suitable catalysts include zinc or cadmium salts of the carboxylic acids of which it is desired to prepare the vinyl esters, mercury salts such as mercury acetate, mercuric chloride, and the like, free phosphoric acid, zinc and cadmium chromites, and silicates and polysilicates of zinc and cadmium. The compounds may be supported on carriers such as activated carbon, wood charcoal, silica gel, activated alumina, and the like.

In general, the reaction is run at temperatures in the range of 150° to 300° C. The upper temperature limit at which the process is operable depends upon the thermal stability of the compounds involved. The use of temperatures within the range of 160° to 210° C. is preferred. The actual values selected within the preferred range are dependent upon the properties of the acid and the activity of the catalyst. Optimum temperature is one which is high enough to maintain the acid in a vaporous condition during contact with the catalyst and one at which catalyst efficiency approaches a maximum as indicated by an exothermic effect within the catalyst bed.

Operation at atmospheric pressure is preferred but, if it is necessary in some instances to insure a practical rate of reaction, superatmospheric pressures may be employed.

While the process has been described with relation to the preparation of vinyl esters, it is equally applicable with the proper adjustment of reaction temperatures and acetylene-to-acid molecular ratios, as known to those skilled in the art, in the production of ethylidene diesters, with all the attendant advantages.

In view of the foregoing disclosures, variations and modifications thereof will be apparent to one skilled in the art, and it is intended to include with the invention all such variations and vodifications except as do not come within the scope of the appended claims.

What is claimed is:

1. The method for avoiding deactivation of an active carbon impregnated with zinc acetate catalyst which is effective in the vapor phase production of esters by the reaction of a member of the group consisting of methyl acetylene, propadiene, and acetylene with a member of the group consisting of a saturated aliphatic monocarboxylic acid containing one to seven carbon atoms and benzoic acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

2. The method for avoiding deactivation of an active carbon impregnated with zinc acetate catalyst which is effective in the vapor phase production of vinyl acetate by the reaction of acetylene with acetic acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

3. The method of claim 2 wherein said non-destructive gas is nitrogen.

4. The method of claim 2 wherein said non-destructive gas is acetylene.

5. The method for avoiding deactivation of an active carbon impregnated with zinc acetate catalyst which is effective in the vapor phase production of vinyl butyrate by the reaction of acetylene with butyric acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

6. The method for avoiding deactivation of an active carbon impregnated with zinc acetate catalyst which is effective in the vapor phase production of vinyl benzoate by the reaction of acetylene with benzoic acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

7. The method for avoiding deactivation of an active carbon impregnated with zinc acetate catalyst which is effective in the vapor phase production of propenyl acetate and isopropenyl acetate by the reaction of propadiene with acetic acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

8. The method for avoiding deactivation of an active carbon impregnated with zinc acetate catalyst which is effective in the vapor phase production of propenyl acetate and isopropenyl acetate by the reaction of methyl acetylene with acetic acid during periods when the said reaction is discontinued which comprises purging said catalyst with a non-destructive gas selected from the group consisting of nitrogen, carbon dioxide, acetylene, methyl acetylene, propadiene, and methane during a period of temporary discontinuance of said reaction.

References Cited in the file of this patent

UNITED STATES PATENTS 2,715,140    Vining  ---------------- Aug. 9, 1955

OTHER REFERENCES

Berkman: Catalysis, (New York, 1940), pp. 294–5, QD 501 B445.